United States Patent [19]

Freedman

[11] Patent Number: 5,217,311
[45] Date of Patent: Jun. 8, 1993

[54] ACCORDION STYLE TYPING MACHINE AND KEYBOARD THEREFOR

[76] Inventor: Kenneth Freedman, 246 Seventh Ave., Brooklyn, N.Y. 11215

[21] Appl. No.: 944,354

[22] Filed: Sep. 14, 1992

[51] Int. Cl.$^5$ ............................................. B41J 5/10
[52] U.S. Cl. ...................................... 400/482; 400/91
[58] Field of Search .................. 400/91, 92, 93, 94, 400/482, 485, 472

[56] References Cited

U.S. PATENT DOCUMENTS

| | | | |
|---|---|---|---|
| 4,042,777 | 8/1977 | Bequaert et al. | 400/479 |
| 4,791,408 | 12/1988 | Heusinkveld | 400/479 |
| 4,971,465 | 11/1990 | Hashimoto | 400/472 |
| 5,065,661 | 11/1991 | Hacker | 84/719 |

FOREIGN PATENT DOCUMENTS 8505704  12/1985  World Int. Prop. O. ............ 400/91

Primary Examiner—Edgar S. Burr
Assistant Examiner—Anthony H. Nguyen
Attorney, Agent, or Firm—Charles E. Baxley

[57] ABSTRACT

A stenotype machine has a casing with a rear panel and a front panel. The casing is substantially symmetrical with respect to a plane bisecting and perpendicular to the rear and front panels. The casing further has a top panel intersecting the front panel at an upper edge thereof and of maximum width at its intersection with the front panel. The machine further includes a keyboard with keys on first, second, third and fourth additional panels which have keys to be operated by the user's right thumb, right fingers, left thumb and left fingers. The second and fourth additional panels intersect vertical side edges of the front panel and make an angle of 60°–70° with each other. The first and third additional panels intersect the second and fourth additional panels, respectively. The second additional panel intersects the first additional panel at right angles thereto and the fourth additional panel intersects the third additional panel at right angles thereto. The machine can be worn, whereby the user can walk around while using the machine. Some of the keys have surfaces with modified texture to serve as a non-visual warning if the user's hand has drifted, whereby the user can make necessary hand readjustment without looking at the keyboard. Certain adjacent pairs of keys are modified to provide spaces therebetween of increased width in the direction facing the user.

7 Claims, 3 Drawing Sheets

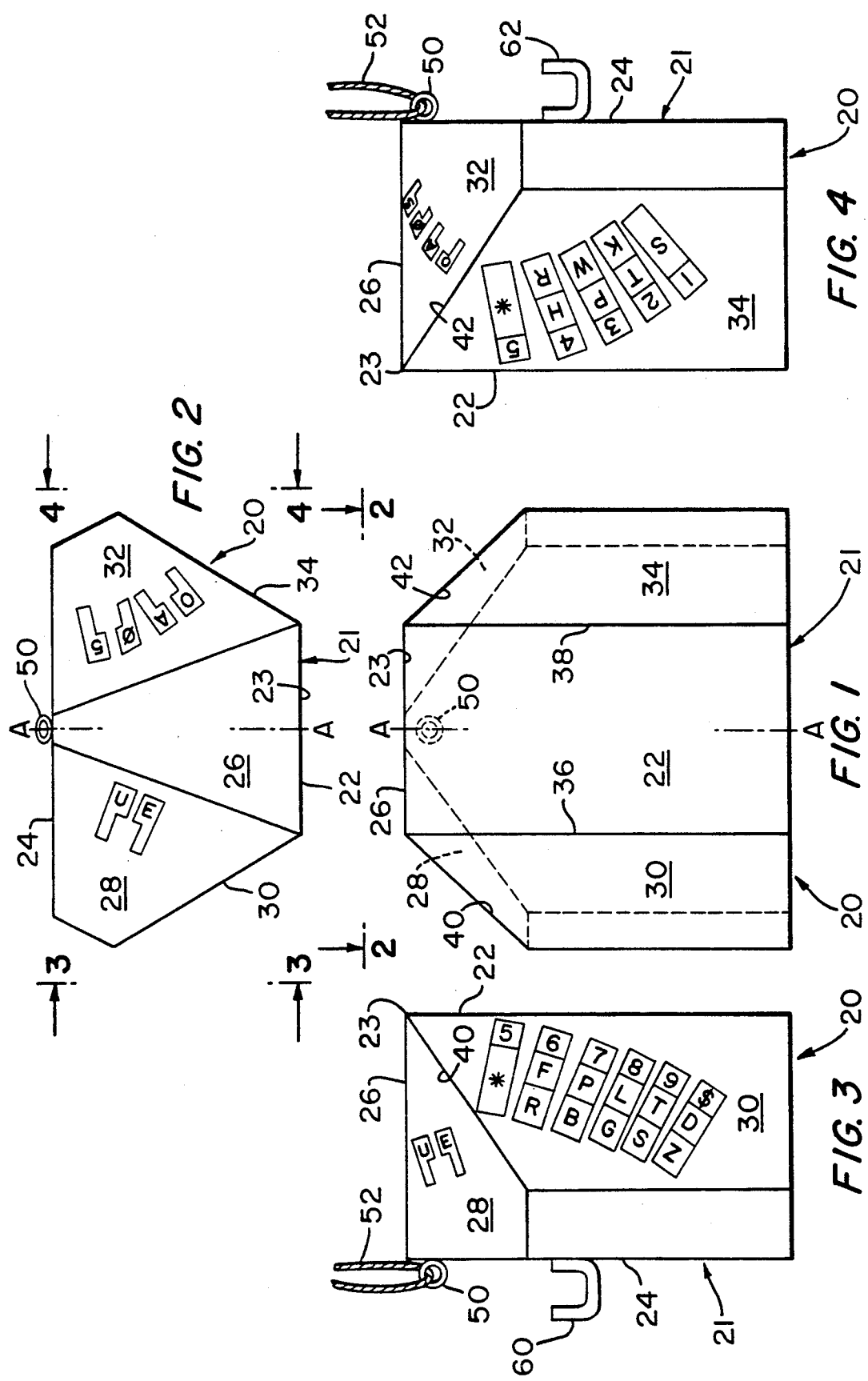

ACCORDION STYLE TYPING MACHINE AND KEYBOARD THEREFOR

BACKGROUND OF THE INVENTION

This invention relates to an accordion style typing machine and a keyboard therefor. The invention is particularly suitable for use in a stenographic machine, and is so disclosed herein, but without limitation.

It is an important object of the invention to provide an accordion style stenographic machine and keyboard therefor which is so configured and arranged as to require substantially zero movement of a user's wrists while using the machine.

It is another important object of the invention to provide such a machine and keyboard configured and arranged to require minimal movement of the user's thumbs and fingers.

It is an additional object of the invention to provide such a machine which can be operated for long periods of time with reduced user fatigue and with increased accuracy.

It is a further object of the invention to provide such a machine which can be worn by the user, thus to enable the user to walk around while operating the machine.

It is still another object of the invention to provide such a machine which provides improved means for avoiding misstroking of the machine.

The manner in which the invention attains the foregoing and additional objects will become apparent hereinafter.

SUMMARY OF THE INVENTION

A typing machine such as a stenotype machine comprises a casing having a rear panel for facing a user and a front panel for facing away from the user. The casing is substantially symmetrical with respect to a vertical plane bisecting and perpendicular to the rear panel and the front panel. The casing further has a top panel that is of maximum width at its intersection with the front panel. The machine further has a keyboard provided by keys on first, second, third and fourth additional panels of the casing. The first additional panel has keys to be operated by the user's right hand thumb, the second additional panel has keys to be operated by the user's right hand fingers, the third additional panel has keys to be operated by the user's left hand thumb and the fourth additional panel has keys to be operated by the user's left hand fingers. The second and fourth additional panels intersect vertical side edges of the front panel and make an acute angle with each other. The first and third additional panels intersect the second and fourth additional panels, respectively.

The acute angle between the second and fourth additional panels is on the order of 60°-70° and the second additional panel intersects the first additional panel at an approximate right angle therewith and the fourth additional panel intersects the third additional panel at an approximate right angle therewith.

The machine further comprises an eyelet affixed to the casing and a cord that passes through the eyelet for placement over a user's head and around the user's neck with the rear panel facing the user, so that the machine can be in effect worn by the user, thus to enable the user to walk around while using the machine.

Some of the keys have surfaces with modified texture to serve as a non-visual warning if the user's hand has drifted, and if so in which direction, whereby the user can make necessary adjustment of his or her hand without looking at the keyboard. The modified texture may be provided, for example, by surface roughening or by a piece of felt.

Certain adjacent pairs of keys are modified to provide spaces therebetween of increased width in the direction facing the user, thus to reduce misstroking of the so modified keys.

DESCRIPTION OF THE DRAWING

FIG. 1 is a front elevation of a preferred typing machine according to the invention and showing configuration only;

FIG. 2 is a top view of the machine on line 2—2 of FIG. 1;

FIG. 3 is a side view of the machine on line 3—3 of FIG. 2;

FIG. 4 is a side view of the machine on line 4—4 of FIG. 2;

DESCRIPTION OF THE INVENTION

Figure 6:
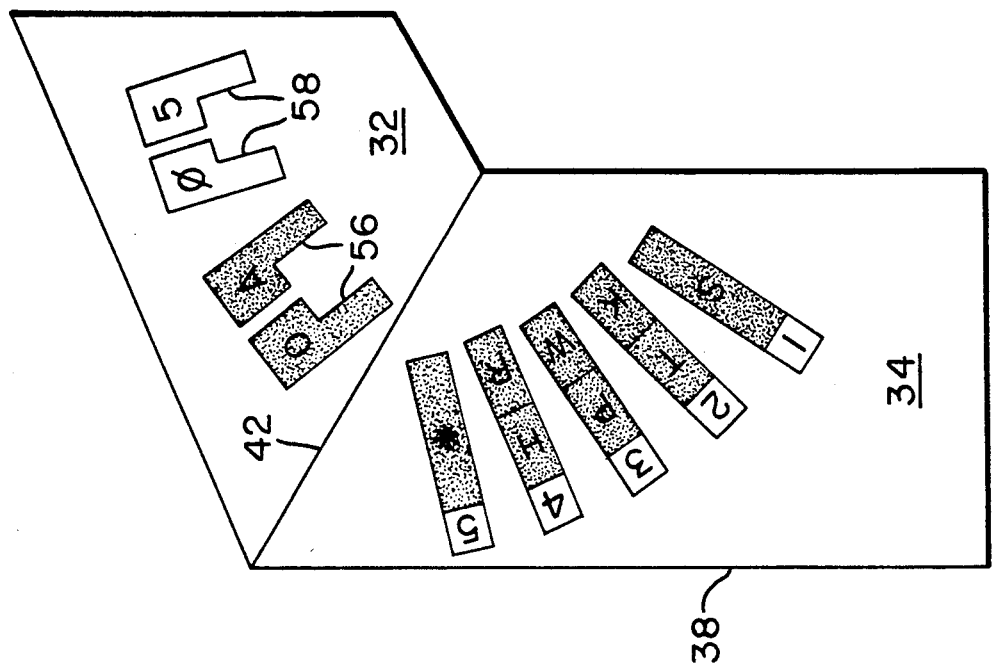
FIG. 6 is a plan view in flattened condition of keyboard panels with keys to be operated by the user's left hand thumb and left hand fingers.

An accordion style typing machine 20 is assumed without limitation to be a stenographic machine. Machine 20, which is shown in FIGS. 1-4, 7 and 8, has an outer casing 21 providing a plurality of external panels, including a front panel 22 that is about 8 inches (20.3 cm) high and about 4.5 inches (11.4 cm.) wide.

Casing 21 also has a rear panel 24 parallel to and facing away from front panel 22 and spaced about 5 inches (12.7 cm) therefrom.

Casing 21 is substantially symmetrical with respect to a vertical plane A—A that is perpendicular to and bisects panels 22 and 24. Casing 21 further has a top panel 26 perpendicular to front and rear panels 22 and 24 and intersecting front panel 22 at its upper edge 23 and uniformly tapering from a maximum width of about 4.5 inches (11.4 cm) at front panel 22 to a minimum width of about 0.5 inch (1.3 cm) at its intersection with rear panel 24.

Machine 20 further includes a keyboard that is provided on four additional panels of casing 21. These four additional panels are panels 28, 30, 32 and 34.

Panel 28 provides E and U keys to be operated by a user's right hand thumb. Panel 30 provides keys to be operated by the fingers of the user's right hand, including keys for numerals 5, 6, 7, 8 and 9, a dollar sign, a space key (marked with an asterisk) and keys for consonants F, P, L, T, D, R, B, G, S and Z.

Panel 32 provides A, O, 5 and 0 keys to be operated by the user's left hand thumb. Panel 34 provides keys to be operated by the fingers of the user's left hand, including keys for numerals 1, 2, 3, 4 and 5 (the key for numeral 1 being alternatively usable for the letter I), and consonants S, T, P, H, K, W and R, as well as a key for a space (marked with an asterisk).

Panel 22 has parallel side edges 36 and 38 that are also side edges of panels 30 and 34, respectively, and panels 30 and 34 make a predetermined acute angle with each other, the precise magnitude of acute angle being not critical. The predetermined acute angle can be on the order of 60°-70°, or, expressed another way, each of panels 30 and 34 may make an angle with plane A—A on the order of 30°-35°.

Panels 28 and 30 have a common edge 40 which is the upper edge of panel 30 and the front edge of panel 28. Edge 40 makes an angle of about 30° with the horizontal, being angled downwardly as one proceeds away from edge 36. Panels 32 and 34 have a common edge 42 which is the upper edge of panel 34 and the front edge of panel 32. Edge 42 makes an angle of about 30° with the horizontal, being angled downwardly as one proceeds away from edge 38.

Panel 28 makes an angle of about 90° with panel 30 and panel 32 makes an angle of about 90° with panel 42.

The keys on each of panels 28, 30, 32 and 34 are more or less arcuately arranged with the centers of curvature to the side of each group of keys remote from plane A—A.

Machine 20 also comprises an eyelet 50 affixed to casing 21, more particularly to rear panel 24 on plane A—A adjacent top panel 26. A cord 52 passes through eyelet 50 and can be placed over a user's head and around the user's neck, with rear panel 24 facing the user, so that machine 20 can be worn by the user. Thus, the user can support machine 20 by his or her neck and can stand up and walk around while using machine 20.

The user operates the keys on panel 28 with his or her right thumb, the keys on panel 30 with his or her right fingers, the keys on panel 32 with his or her left thumb and the keys on panel 34 with his or her left fingers, all with substantially zero movement of his or her wrists and minimal movement of thumbs and fingers. In other words, the keys are in the right places with respect to the user's hands.

Figure 5:
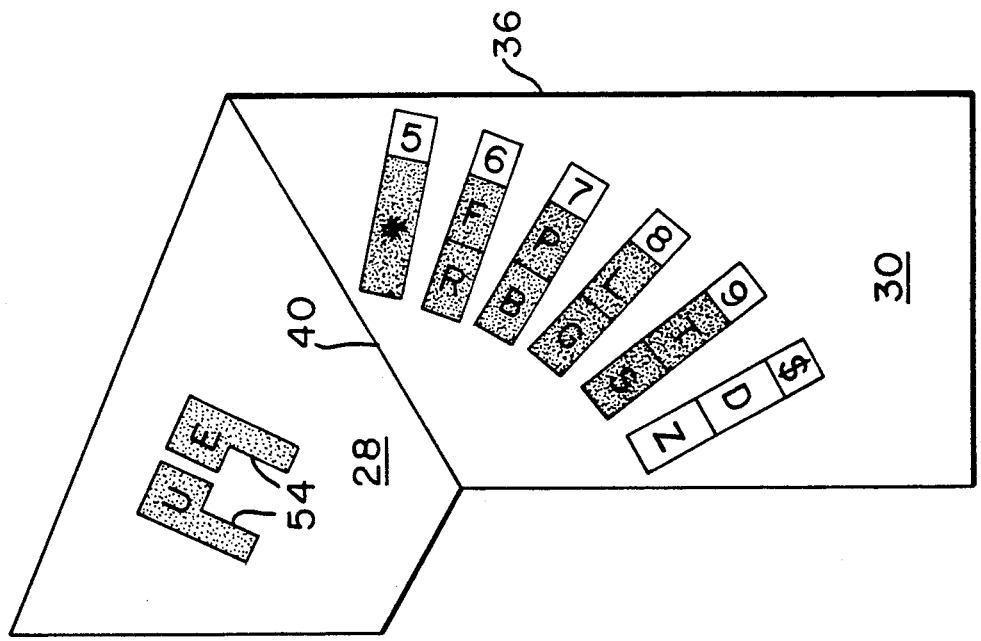
FIG. 5 is a plan view of flattened condition of keyboard panels with keys to be operated by a user's right hand thumb and right hand fingers.
Figure 8:
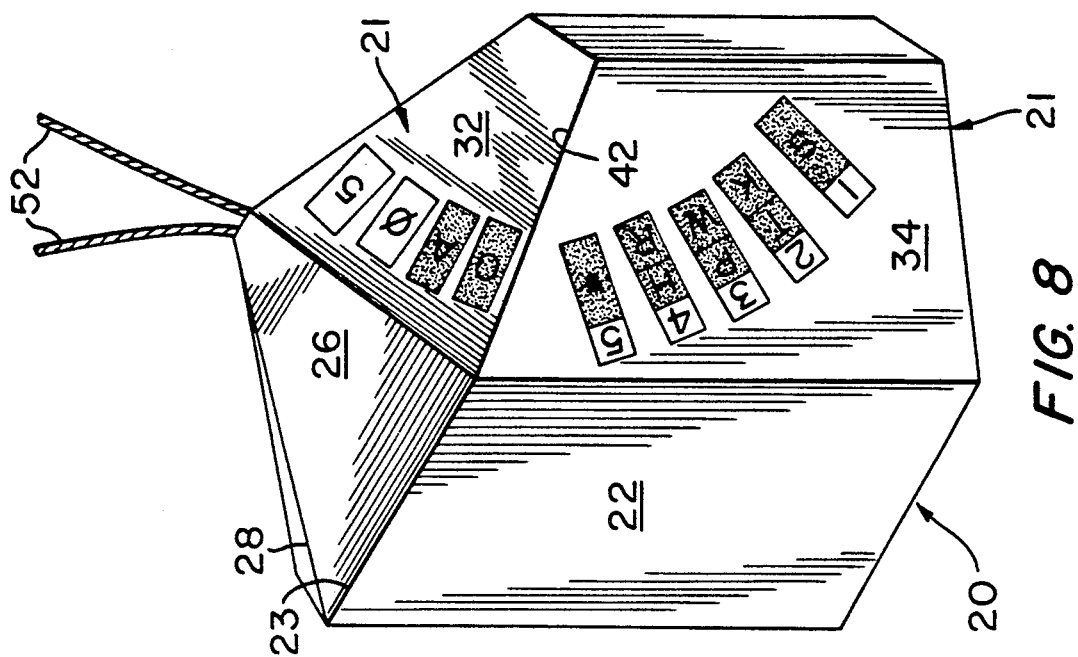
FIG. 8 is a perspective view of the machine featuring the keyboard panels of FIG. 6, i.e., the panels operated by the user's left fingers and left thumb.
Figure 7:
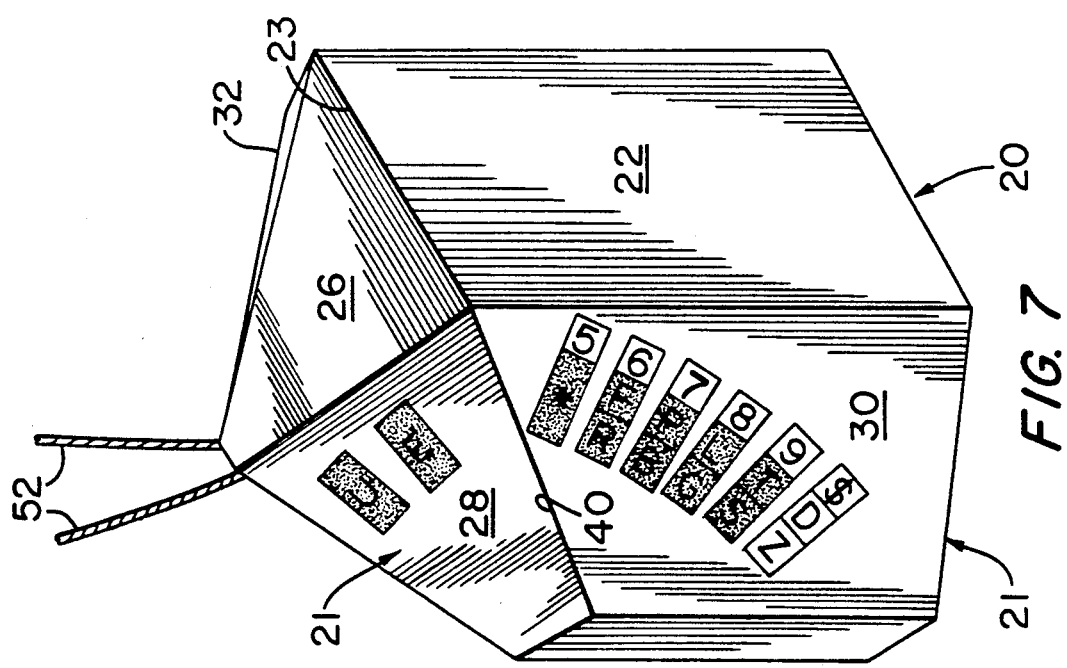
FIG. 7 is a perspective view of the machine featuring the keyboard panels of FIG. 5, i.e., the panels operated by the user's right fingers and right thumb.

A few additional features are noteworthy and important. Certain of the keys are provided with surfaces that have modified textures, to serve as a non-visual warning if the user's hand has drifted and, if so, in which direction, whereby the user can make necessary hand readjustment without looking at the keyboard. This feature will be described with particular reference to FIGS. 5 and 6, in which stippling is shown applied to all keys except the number keys (FIGS. 5 and 6) and the D, Z and dollar sign keys (FIG. 5). The modified textures can be provided, among other ways, by pieces of felt applied to the keys or by providing the modified keys with roughened molded surfaces.

It is also noteworthy that the E and U keys in FIG. 5 are provided with a space therebetween which is of increased width in the direction facing the user, as are the A and 0 keys and the 5 and 0 keys in FIG. 6. This increased space width is indicated at 54, 56 and 58 and reduces misstroking of the involved keys.

Machine 20 is also provided with wrist rests 60 and 62, as shown in FIGS. 3 and 4, for increased user comfort.

It is apparent that the invention well attains the stated objects and advantages, among others.

The disclosed details are exemplary only and are not to be taken as limitations on the invention except as those details may be included in the appended claims.

What is claimed is:

1. A typing machine comprising a casing having a rear panel for facing a user and a front panel for facing away from the user, said casing being substantially symmetrical with respect to a plane bisecting and perpendicular to said rear panel and said front panel, said casing further having a top panel intersecting said front panel at an upper edge thereof and of maximum width at its intersection with said front panel, and said machine further including a keyboard provided by keys on first, second, third and fourth additional panels of said casing, said first additional panel having keys to be operated by the user's right hand thumb, said second additional panel having keys to be operated by the user's right hand fingers, said third additional panel having keys to be operated by the user's left hand thumb and said fourth additional panel having keys to be operated by the user's left hand fingers, said second and fourth additional panels intersecting vertical side edges of said front panel and making an acute angle with each other, and said first and third additional panels intersecting said second and fourth additional panels, respectively.

2. The typing machine of claim 1 wherein said acute angle between said second and fourth additional panels is on the order of 60°-70°, said second additional panel intersects said first additional panel and makes an approximate right angle therewith and said fourth additional panel intersects said third additional panel and makes an approximate right angle therewith.

3. The typing machine of claim 1 further comprising an eyelet affixed to said casing and a cord passing through said eyelet for placement over a user's head and around the user's neck with said rear panel facing the user, so that said machine can be worn by the user, to permit the user to walk around while using said machine.

4. The typing machine of claim 1 wherein some of said keys have surfaces with modified texture to provide a non-visual warning if the user's hand has drifted, and if so in which direction, whereby the user can make necessary hand readjustment without looking at the keyboard.

5. The typing machine according to claim 4 wherein said modified texture is provided by roughening.

6. The typing machine according to claim 4 wherein said modified texture of each said modified key is provided by a piece of felt.

7. The typing machine according to claim 1 wherein certain adjacent pairs of keys are modified to provide spaces therebetween of increased width in the direction facing the user, thus to reduce misstroking of said modified keys.

* * * * *